US005867118A

United States Patent [19]

McCoy et al.

[11] Patent Number: 5,867,118

[45] Date of Patent: Feb. 2, 1999

[54] APPARATUS FOR AND METHOD OF CLASSIFYING PATTERNS

[75] Inventors: Richard D. McCoy, Winter Park; Charles E. Stirman, Maitland; James N. O'Sullivan; Yvette M. Gordon, both of Orlando, all of Fla.

[73] Assignee: Lockheed Martin Corporation, Bethesda, Md.

[21] Appl. No.: 485,771

[22] Filed: Jun. 7, 1995

[51] Int. Cl.[6] .......... G01S 7/41

[52] U.S. Cl. .......... 342/90; 342/192; 342/193

[58] Field of Search .......... 342/90, 192, 193

[56] References Cited

U.S. PATENT DOCUMENTS

| | | | |
|---|---|---|---|
| 3,614,626 | 10/1971 | Dillard | 375/346 |
| 3,806,929 | 4/1974 | Moore | 342/90 |
| 4,707,697 | 11/1987 | Coulter et al. | 342/25 |
| 4,907,001 | 3/1990 | Harmuth | 342/159 |
| 4,992,797 | 2/1991 | Gjessing et al. | 342/192 |
| 5,417,215 | 5/1995 | Evans et al. | 128/660.06 |
| 5,481,269 | 1/1996 | Imhoff et al. | 342/90 |
| 5,504,487 | 4/1996 | Tucker | 342/90 |
| 5,561,431 | 10/1996 | Peele et al. | 342/90 |

OTHER PUBLICATIONS

O. Rioul et al., "Wavelets and Signal Processing", *IEEE SP Magazine*, Oct. 1991, pp. 14–38.

"Advanced Topics in Wavelets and Adapted Waveform Analysis", Martin Marietta Technologies, Inc., Oct. 4–6, 1993.

*Primary Examiner*—John B. Sotomayor
*Attorney, Agent, or Firm*—Burns, Doane, Swecker & Mathis, L.L.P.

[57] ABSTRACT

An apparatus for and method of classifying a pattern including performing a wavelet transform. The invention finds particular application in the field of automatic target recognition, in which the pattern appears in a return radar signal, and the classification is used to classify a target.

32 Claims, 6 Drawing Sheets

LL CHANNEL
CENTROID
CELL NUMBER
FEATURE WINDOW
POWER ($m^2$)
3
2.5
2
1.5
1
0.5
0
5
30
45
60

APPARATUS FOR AND METHOD OF CLASSIFYING PATTERNS

This invention was made with Government support under Contract No. F49620-91-C-0096 awarded by the United States Air Force. The Government has certain rights in this invention.

BACKGROUND

This invention pertains to apparatus for and methods of classifying patterns, and, more particularly, to the processing of signals for object recognition.

In many fields, it is desirable to extract information which identifies an object from signals which also contain extraneous information. For example, radar automatic target recognition (ATR) starts with a set of measurements on the target. This is shown diagrammatically in FIG. 1. A transmitter 10 sends a radar beam 20 toward a target 30. The return radar beam 40 is received by a receiver 50 which sends signals indicative of selected parameters of the return radar signal 40 to an automatic target recognition system 60. The transmitter 10 and the receiver 50 may be separate (bi-static) or collocated (monostatic).

In the automatic target recognition system 60 the signals from the receiver 50 are subjected to a Fourier transform and the magnitude of the transformed signals is detected to create a pattern space. The pattern space is usually of high dimensionality and therefore needs to be reduced to create a feature space. The reduction must be performed, however, without significant loss of identifying information.

To be more specific, wide bandwidth frequency agile processing yields high resolution profiles of a target. These profiles are made up of the return from radar scattering centers on the target. The profiles change with aspect angle since the scattering centers become visible or obscured as the aspect angle changes with respect to the radar line-of-sight. By transmitting with multiple polarized radiation, different profiles can be observed which reflect different slices of the target. For example, by transmitting both circular polarizations (Left Hand Circular (LHC) and Right Hand Circular (RHC)) and receiving both polarizations, a full scatter matrix may be developed as follows:

$$S_c = \begin{bmatrix} V_{LL} & V_{LR} \\ V_{RL} & V_{RR} \end{bmatrix}$$

In the above expression, the first letter of each subscript refers to the received polarization and the second letter of each subscript refers to the transmitted polarization with L being LHC and R being RHC.

Each element of the scatter matrix is a high resolution range profile of the target. The LL and RR returns contain the "even" bounce type of scatter such as comes from a dihedral (2 sided reflector). The LR and RL returns contain the odd bounce scattering such as from a trihedral (3 sided reflector), a sphere, or a flat plat. For a monostatic radar (one antenna used for both transmission and reception) the odd bounce LR and RL profiles are the same, so only one is used.

The overall process used in conventional ATR is shown diagrammatically in FIG. 2. First, a return signal is acquired and a domain transform such as a Fast Fourier Transform (FFT) is performed in a domain transform unit 70. The domain transform may be performed by a suitably programmed general computing device. This creates a measurement space which is operated on by a magnitude detector 80. The output of the magnitude detector 80 is considered to be the pattern space.

FIG. 3 shows an example of a high resolution profile of an element of the polarimetric scatter matrix of a target at a 45 degree aspect angle. This is one of a set of profiles or signatures which together comprise the pattern space of a full polarimetric, high range resolution radar. When a target is placed on a turntable and rotated through 360 degrees of aspect angle, profiles such as that shown expand and contract over the radial projection of the length of the target-as the projected length and the number of dominant scatterers in the profile varies.

The signature in FIG. 3 constitutes an N-dimensional vector. There is one such N-dimensional vector for each of the scatter matrix elements of interest (LL, LR, and RR for monostatic operation). Furthermore, the profiles represent an N-dimensional random vector since they depend on a random aspect angle.

As can be seen in FIG. 3, the target does not occupy the full profile presented. The part of the profile not taken up by the target is considered noise or background clutter. In the case shown, the full profile is length 64 and the target only occupies a portion of this space at a 45 degree aspect angle.

The full 64 point profiles are the information about the target observable by the radar in the three polarization cuts. In pattern recognition, the pattern space, which is usually large (in this case 3×64), needs to be reduced to a reasonably-sized feature space that captures the bulk of the information presented.

As indicated by FIG. 2, the conventional method of developing the feature space from the pattern space uses a heuristic feature selector 90 which operates in accordance with a statistical analysis of the target signature in terms of extent of the target and where the dominant scatterers are located. A common method of selecting features, depicted in FIG. 4, involves choosing the centroid of the pattern as a reference and then choosing a range of values ("placing a window" around) the centroid. Then experiments are performed by varying the extent of the target extracted as features. Various combinations of targets and classifiers such as the pattern classifier 100 are trained and tested to select the best features. Heuristic judgment is involved in the final decision.

The process used can thus be summarized as follows. First, the pattern recognition system receives a set of data (in the example, a set of target signatures as shown in FIG. 3). Then, after a domain transform and a magnitude detection, the system finds a common reference by a centroiding technique. Then, using the results from the statistical analysis, the system places a window around the reference point enclosing a reduced feature set. The resulting set of features is then used for training and testing a classifier.

Current techniques thus rely on heuristic feature selection or require many features (high dimensionality). Those practices which rely on heuristic approaches for selecting features suffer from the disadvantage that the heuristic approach must be constantly changed at great cost as targets are added or background clutter environments change.

There thus remains a need to improve image recognition systems such as ATR by achieving faster and more robust performance, reducing hardware, cost and processing requirements, and improving reliability.

SUMMARY

More particularly, in one aspect, the present invention comprises a method of classifying a pattern. The method includes acquiring a signal, the signal including an input pattern to be classified, sampling the acquired signal to produce an intermediate pattern based on the signal, and performing either a wavelet transform or a wavelet packet transform on at least a portion of the intermediate pattern to produce a wavelet transformed pattern. A reduced feature space is then selected from the wavelet transformed pattern and the input pattern is classified on the basis of the reduced feature space.

The step of acquiring a signal may include sending a radar signal using a single polarized transmitter and receiving a return radar signal using a single or dual polarized receiver.

The intermediate pattern may be what is referred to in pattern recognition nomenclature as a pattern space, in which case the step of performing a wavelet transform on at least a portion of the intermediate pattern comprises the step of performing a wavelet transform on a selected subset of the pattern space.

The step of selecting a reduced feature space from the wavelet transformed pattern may include the step of selecting the reduced feature space using mathematical or heuristic methods based on statistics of the wavelet features. The step of classifying the pattern on the basis of the reduced feature space may include classifying a target, discriminating between targets and man-made nontargets, or discriminating between targets and natural clutter on the basis of the selected reduced feature space.

The step of sampling the acquired signal may include performing a domain transform on the acquired signal, and, more specifically, of performing an FFT on the acquired signal.

The invention may also be considered as embodied as a method of radar automatic target recognition comprising the steps of sending a radar signal using a dual polarized transmitter, receiving a return radar signal using a dual polarized receiver, defining a pattern space based on the return radar signal, performing a wavelet transform (wavelet or wavelet packet, as stated below) on the entire pattern space, selecting a reduced feature space from the wavelet transformed pattern space, and classifying a target on the basis of the selected reduced feature space. Defining a pattern space may be accomplished by sampling the signal, and, more particularly, by performing a domain transform on the return radar signal. The magnitude of the transformed radar return may be detected before the wavelet transform may be performed.

As regards apparatus, the invention may be embodied as means for acquiring a signal, the signal including an input pattern to be classified, means for sampling the acquired signal to produce an intermediate pattern based on the signal, means for performing a wavelet or wavelet packet transform on at least a portion of the intermediate pattern to produce a wavelet transformed pattern, means for selecting a reduced feature space from the wavelet transformed pattern, and means for classifying the input pattern on the basis of the reduced feature space.

The means for acquiring a signal may include a single polarized transmitter and a single polarized receiver, a single polarized transmitter and a dual polarized receiver, a dual polarized transmitter and a single polarized receiver, or a dual polarized transmitter and a dual polarized receiver. The means for performing a wavelet transform on at least a portion of the intermediate pattern may include means for performing a transform on the entire immediate pattern or on a selected subset of the intermediate pattern.

The means for selecting a reduced feature space from the wavelet transformed pattern may include means for selecting the reduced feature space using mathematical methods based on statistics of the wavelet features. Alternatively, the means for selecting a reduced feature space from the wavelet transformed pattern may include means for selecting the reduced feature space using heuristic methods based on the statistics of the wavelet features.

The means for classifying the pattern on the basis of the reduced feature space may include means for classifying a target, means for discriminating between targets and man-made nontargets, or means for discriminating between targets and natural clutter on the basis of the selected reduced feature space.

The means for sampling the acquired signal may include means for performing a domain transform on the acquired signal, and, in particular, for performing an FFT.

Apparatus for the invention when embodied as a radar automatic target system may include a dual polarized transmitter for transmitting dual polarized radar signals, a dual polarized receiver for receiving return dual polarized radar signals, means responsive to the dual polarized receiver for defining a pattern space based on the return dual polarized radar signals, means, responsive to the defining means, for performing a wavelet transform on the entire pattern space to generate a wavelet transformed pattern space, means, responsive to the wavelet transform means, for selecting a reduced feature space from the wavelet transformed pattern space, and means, responsive to the selecting means, for classifying a target on the basis of the selected reduced feature space.

The classifying means may include a quadratic classifier. The pattern space defining means may include an FFT means for performing an FFT on the return dual polarized radar signals to produce Fourier transformed radar signals and means, responsive to the FFT means, for detecting the magnitude of the Fourier transformed radar signals.

DETAILED DESCRIPTION

A preferred exemplary embodiment of a process according to the invention uses compactly supported, orthonormal wavelet bases, although other bases may be used as well. Wavelets are described, for example, in Rioul, Olivier and Vetterli, Martin, "Wavelets and Signal Processing", IEEE SP Magazine, October, 1991; Chui, Charles, *An Introduction to Wavelets,* Academic Press, 1992, and Daubechies, Ingrid, *Ten Lectures on Wavelets,* CBSM-NSF Regional Conference Series in Applied Mathematics, Capital City Press, 1992. As is known, the term "wavelet transform" has been used in reference to a first subset of operations also referred to "wavelet transforms" based on wavelets as well as to a second subset of operations referred to as "wavelet packet transforms" based on wavelet packets. Unless otherwise suggested by context, the term "wavelet transform" as used in this specification and the claims refers to both subsets, that is, to both wavelet transforms and wavelet packet transforms. Similarly, "wavelets" will refer to both wavelets in the narrower sense of the term as well as wavelet packets.

Figure 4:
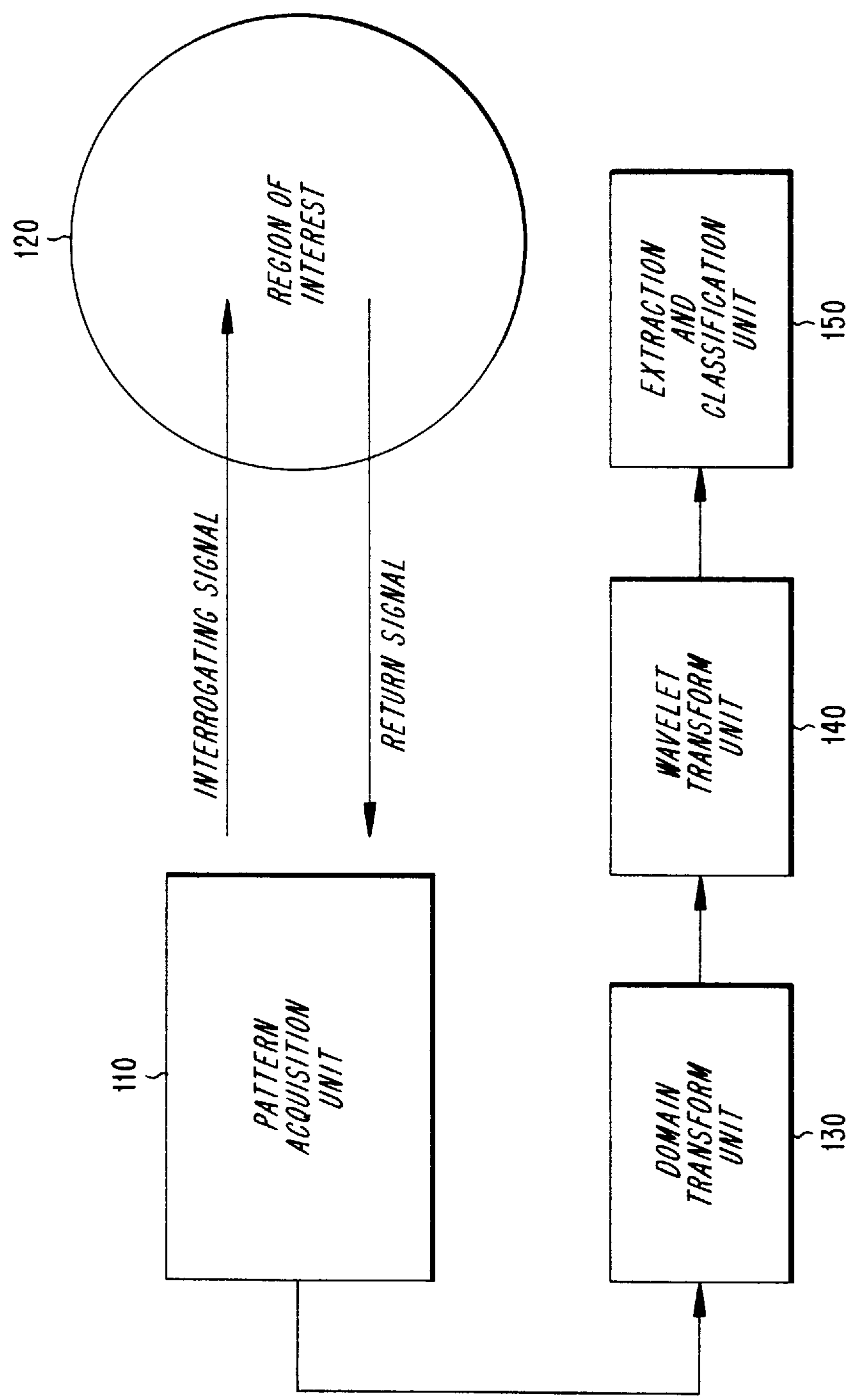
FIG. 4 is a functional block diagram of a pattern recognition system according to one embodiment of the present invention.

As shown in FIG. 4, in a general application, one embodiment of the invention includes a pattern acquisition unit 110 which acquires a pattern containing data concerning a region of interest 120. For example, as suggested above, the pattern acquisition unit 110 may be radar receiver/transmitter, with the region of interest corresponding to a target to be identified. The pattern acquisition unit 110 may also be a system for acquiring energy over all of or any portion of the entire electromagnetic spectrum such as the ultraviolet, visible, infrared, or x-ray portions. The pattern acquisition unit may also be one that acquires an ultrasonic image of the region of interest.

After acquisition, the original pattern is provided to a device 130 for sampling the acquired signal. In the embodiment depicted, sampling is performed by carrying out a domain transform of the original pattern to create an intermediate pattern. In the present invention, the preferred domain transform is the FFT. The domain transform is carried out in a known manner using a suitably programmed general computing device. The domain transform unit can also carry out a magnitude detection as in the prior art.

The intermediate pattern is supplied to a device 140 for effecting a wavelet transform. In general, wavelet analysis uses a set of basis functions which provide increasing resolution at increasing scale. The wavelet analysis results in a set of wavelet coefficients. These coefficients are then selected by a feature extraction and classification unit 160, which additionally classifies the pattern on the basis of the selected coefficients.

Figure 5:
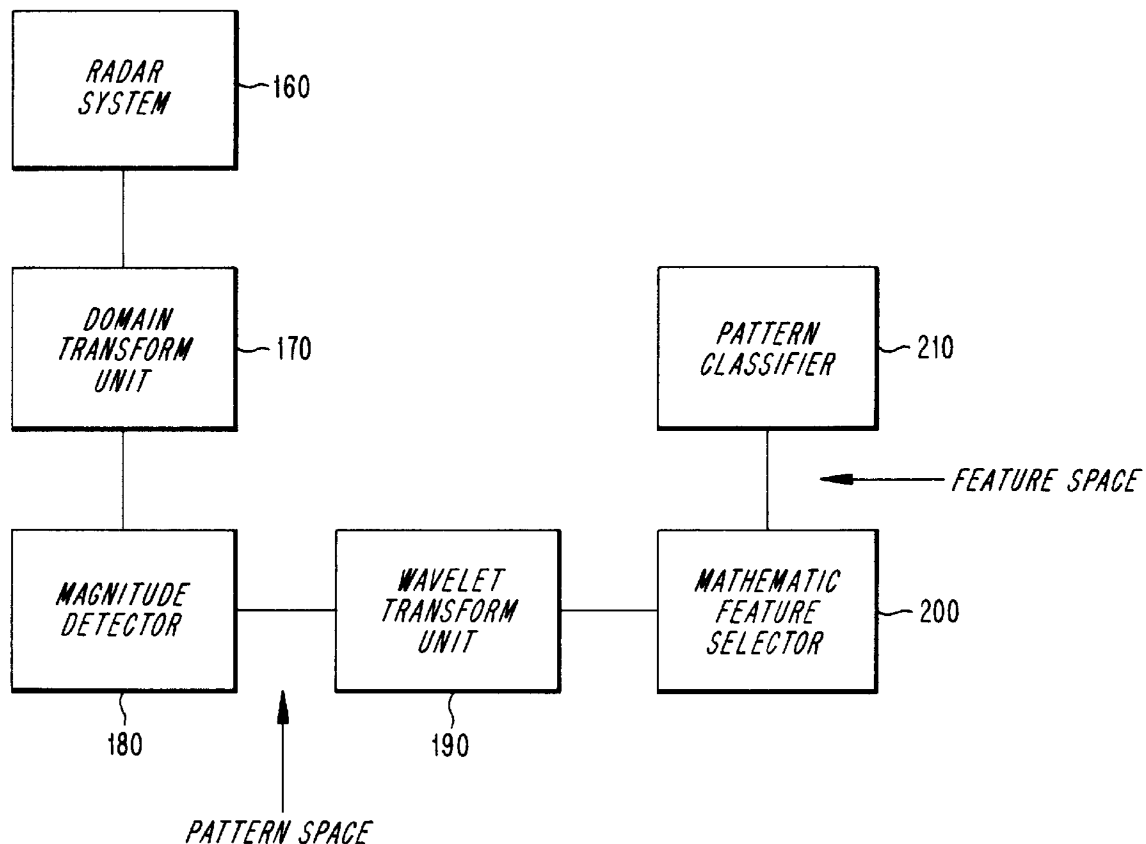
FIG. 5 is a functional block diagram of an automatic target recognition system according to one embodiment of the present invention.

A specific implementation of a system according to the present invention is shown in FIG. 5. In the embodiment of FIG. 5, pattern acquisition is accomplished by a radar system 160. The original pattern is first subjected to a domain transform (e.g. an FFT) by a domain transform unit 170 to create an intermediate pattern, called a pattern space in this application. A magnitude detector 180 then detects the magnitude of the transformed pattern space. The pattern space is then operated on by a wavelet transform unit 190. This unit performs a wavelet transform on the pattern space, or at least on a selected subset of the pattern space. A mathematical feature selector 200 then selects a reduced feature set from the wavelet transformed space by selecting various coefficients produced in the transform to create a reduced feature space. In other words, the wavelet transform breaks up the pattern space by an orthonormal expansion, and the significant coefficients of the transform represent the essential information in the pattern space in a substantially reduced feature space. The mathematical feature selector 200 then automatically selects this reduced feature space which is then sent to the classifier 210 for training and testing.

Figure 6:
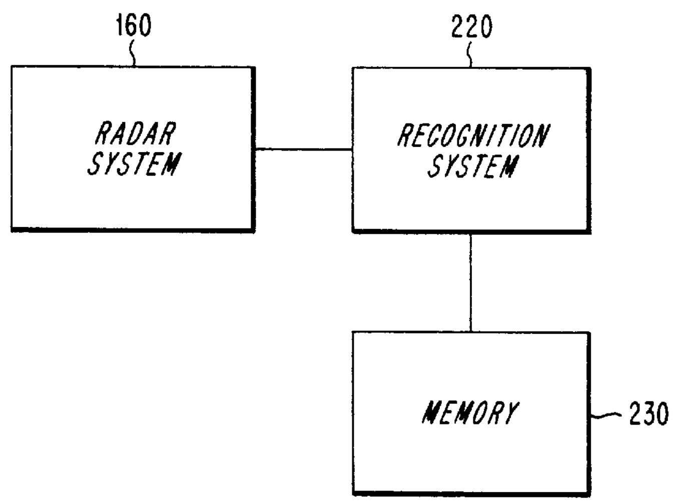
FIG. 6 is a functional block diagram of an automatic target recognition system according to another embodiment of the present invention.
Figure 7:
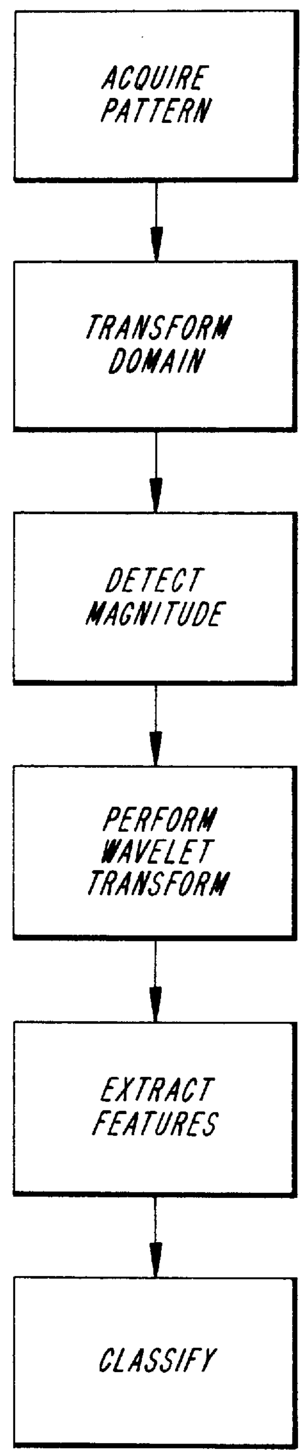
FIG. 7 is a flowchart for a program for the embodiment of FIG. 6.

The features of domain transform, magnitude detection, wavelet transform, feature selection, and classification can be implemented by one or more suitably programmed computers, or can be hard wired, as a given application may dictate. This is illustrated in FIG. 6, which shows a system implemented using a radar system 160 and a recognition system 220. The recognition system 220 includes a processor operating under the control of a program stored in a memory 230. The memory 230 may be any suitable memory for retrievably storing data, including but not limited to fixed or removable magnetic media, RAM, ROM, or optical storage devices. The program stored in the memory 230 sequentially causes the recognition system 220 to perform the steps of domain transform, magnitude detection, wavelet transform, feature selection or extraction, and classification as described above and as shown in FIG. 7.

One aspect of the invention resides not merely in the use of an orthonormal basis such as wavelets, but also on selecting the point in the process when the transform can most advantageously be applied. A figure of merit for any classification system is the Probability of Correct Classification ("Pcc"). Comparative results of Pcc measurements for systems of several configurations are given in the table below. Results are given in terms of net variation from Pcc. The training and testing data for this comparison was derived from target turntable data embedded in a clutter background at three clutter backscatter levels and at three target ranges corresponding to near range, mid range, and far range. Full sets of signatures were obtained over 360 degrees of aspect angle for five turntable tilt angles (elevation aspect). Each full rotation of the turntable provided about 15,000 signature samples. The data was split up into training sets and testing sets. Then, the turntable target signatures were embedded in clutter obtained through flight tests.

All instances of baseline feature selection (systems 1, 2, and one part of system 4) used a quadratic classifier. System 5 also included a quadratic classifier. All systems including heuristic feature selection used profile matching. System 4 is a hybrid and represents the fusion of a baseline and heuristic technique. The following table presents the results as averages of these conditions. Thus, in the table, baseline results are associated with system 1. System 2, using the same type classifier with baseline features reduced using wavelets, actually yields a slight reduction in Pcc. System 3 shows profile matching results. System 4 exhibits the performance resulting from fusing the classifier of the system 2 with a profile matching classifier. System 5 is the result of selecting features strictly with wavelets and results in a 6.6% improvement in Pcc.

| System Number | Feature Selection | Set Size | Reduction Method | Set Size After Reduction | Result |
|---|---|---|---|---|---|
| 1 | Baseline | 45 | none | — | Pcc |
| 2 | Baseline | 45 | Wavelet | 24 | Pcc–.5% |
| 3 | Heuristic | 47 | none | — | Pcc–.57% |
| 4 | Baseline | 45 | Wavelet | 30 | Pcc+3.3% |
| | Heuristic | 47 | none | — | |
| 5 | Wavelet | 48 | none | — | Pcc+6.6% |

System 1 is a standard configuration of the use of baseline feature selection and a quadratic classifier. This configuration provides a standard Pcc. As indicated by the entry for system 2, wavelets can reduce the baseline feature set by about two-to-one (45 to 24) with only a minor degradation in Pcc. The decrease in dimensionality achieved with the two-to-one reduction brings with it an associated decrease in computational workload. This result thus indicates the potential for wavelet-based transforms to reduce the dimensionality of the pattern recognition problem compared to classical methods. Using the wavelet-based transform to reduce the baseline feature set does not, however, achieve a net improvement in Pcc which is a desired goal.

Similar results are obtained when a wavelet-based transform is used to reduce a baseline feature set as when heuristic features are supplied to a profile matching classifier (system 3)). However, by fusing the two classifiers together (system 4), a net improvement of 3.3 percent over the baseline classifier can be achieved.

Figure 1:
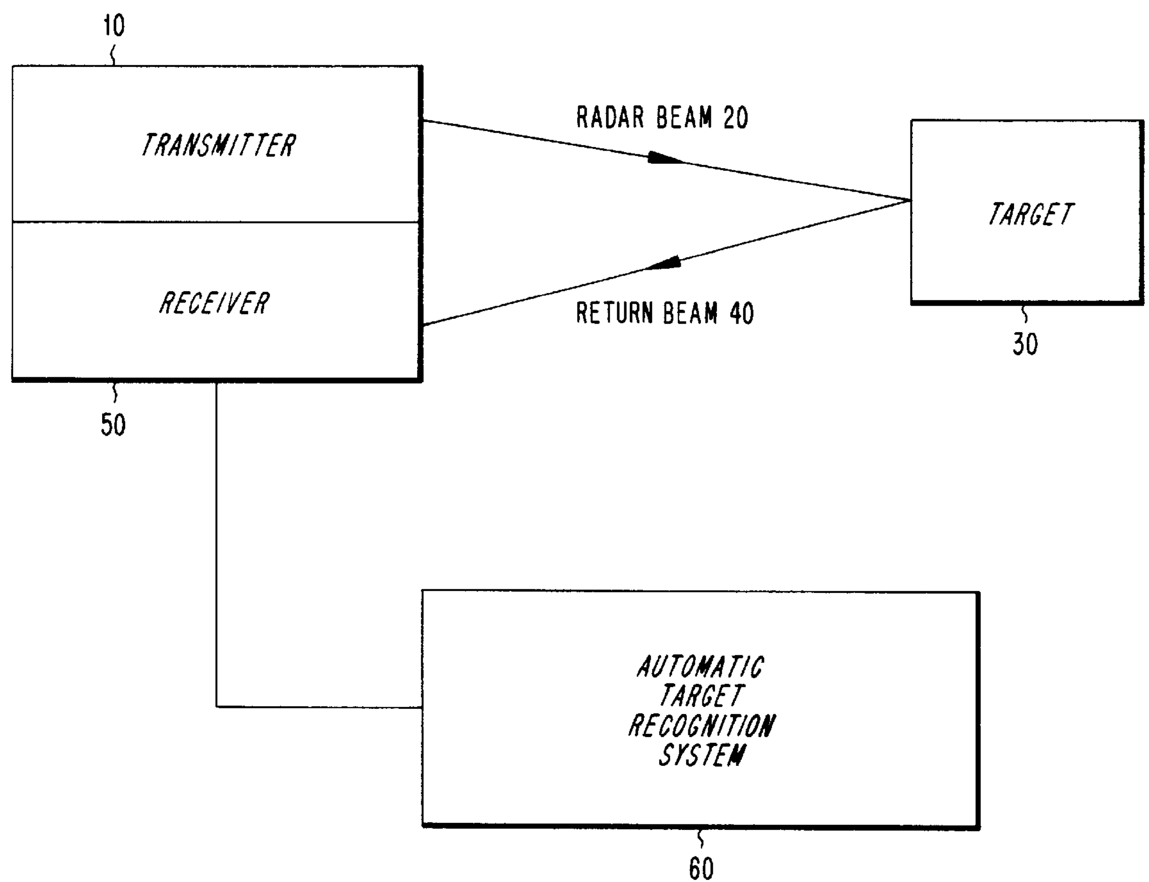
FIG. 1 is a diagrammatic representation of a conventional radar system.
Figure 2:
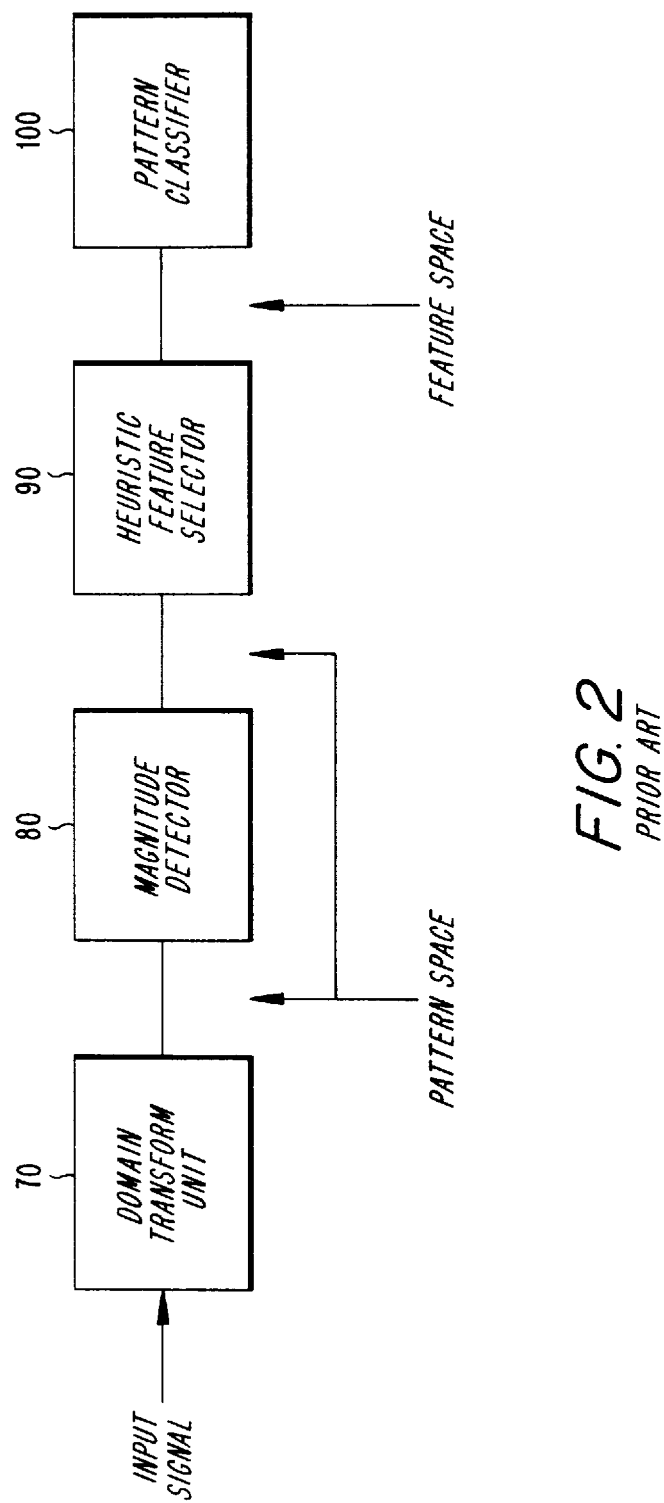
FIG. 2 is a functional block diagram of a conventional automatic target recognition system.
Figure 3:
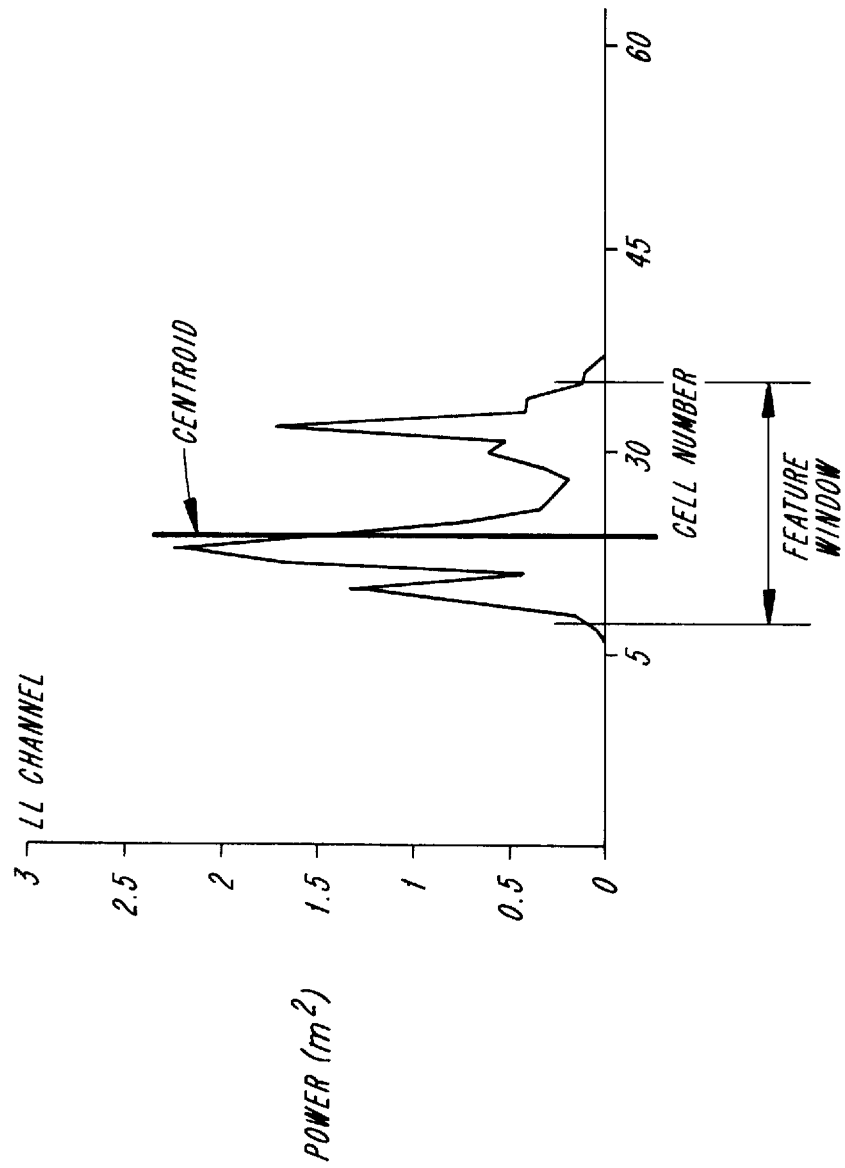
FIG. 3 is representative full polarimetric high resolution radar profile.

The two-to-one reduction of the baseline feature set indicates the power of wavelets to systematically select the essential information from a given pattern space at a reduced dimensionality. The greatest improvement in Pcc, however, is observed by applying the wavelet process to what the radar observes—the full pattern space shown in FIG. 3 instead of after the features have been selected. Performing a wavelet transform on the pattern space, the same number of features are selected as in the baseline approach (16 features per polarization channel—the number of selected features needs to be an integral power of 2). The difference between the baseline approach and the wavelet approach is that for the wavelet approach the features are selected mathematically instead of heuristically.

Wavelets represent a viable procedure for selecting a subset of features from a large pattern space. The nature of the wavelet transform is to retain the primary information in the largest coefficients of the transform. These coefficients become the features which are used for training and testing classifiers. In larger dimensional spaces such as radar images created by synthetic aperture radar (SAR), the power of wavelet-based feature selection is expected to be even more dramatic.

The invention has been described above in terms of its applicability to the field of radar. These wavelet and wavelet packet transforms, however, can also advantageously be used in other applications where it is necessary or desirable to extract meaningful information from a signal having additional components. These include applications in nuclear magnetic resonance (NMR), image processing, electrocardiograms (EKG), electroencephalograms (EEG), sonar, satellite image processing, and seismology. The invention should thus not be regarded as being limited to the field of radar.

The invention has been described above using certain specific embodiments in illustration. One of ordinary skill in the art will readily appreciate that these embodiments are illustrative only, and that modifications and other alternative embodiments can be created without departing from the essential subject matter of the invention. The invention should therefore not be regarded as limited to any of the foregoing embodiments, but instead to be fully commensurate in scope with the following claims.

What is claimed is:

1. A method of classifying a pattern, said method comprising the steps of:

acquiring a signal, said signal including an input pattern to be classified;

sampling the acquired signal to produce an intermediate pattern based on said signal;

performing a transform on at least a portion of said intermediate pattern, said transform being from the group consisting of wavelet transforms and wavelet packet transforms, to produce a wavelet transformed pattern;

selecting a reduced feature space from the wavelet transformed pattern; and classifying said input pattern on the basis of said reduced feature space.

2. A method as claimed in claim 1, wherein said step of acquiring a signal comprises the steps of:

sending a radar signal using a single polarized transmitter; and receiving a return radar signal using a single polarized receiver.

3. A method as claimed in claim 1, wherein said step of acquiring a signal comprises the steps of:

sending a radar signal using a dual polarized transmitter; and receiving a return radar signal using a single polarized receiver.

4. A method as claimed in claim 1, wherein said step of acquiring a signal comprises the steps of:

sending a radar signal using a single polarized transmitter; and receiving a return radar signal using a dual polarized receiver.

5. A method as claimed in claim 1, wherein said step of acquiring a signal comprises the steps of:

sending a radar signal using a dual polarized transmitter; and receiving a return radar signal using a dual polarized receiver.

6. A method as claimed in claim 1, wherein said intermediate pattern is a pattern space.

7. A method as claimed in claim 6, wherein said step of performing a wavelet transform on at least a portion of said intermediate pattern comprises the step of performing a wavelet transform on a selected subset of the pattern space.

8. A method as claimed in claim 1, wherein said step of selecting a reduced feature space from the wavelet transformed pattern comprises the step of selecting the reduced feature space using mathematical methods based on statistics of the wavelet features.

9. A method as claimed in claim 1, wherein said step of selecting a reduced feature space from the wavelet transformed pattern space comprises the step of selecting the reduced feature space using heuristic methods based on statistics of the wavelet features.

10. A method as claimed in claim 1, wherein said step of classifying said pattern on the basis of said reduced feature space comprises the step of classifying a target on the basis of said selected reduced feature space.

11. A method as claimed in claim 1, wherein said step of classifying said pattern on the basis of said reduced feature space comprises the step of discriminating between targets and man-made nontargets on the basis of said selected reduced feature space.

12. A method as claimed in claim 1, wherein said step of classifying said pattern on the basis of said reduced feature space comprises the step of discriminating between targets and natural clutter on the basis of said selected reduced feature space.

13. A method as claimed in claim 1, wherein said step of sampling the acquired signal comprises the step of performing a domain transform on the acquired signal.

14. A method as claimed in claim 13, wherein said domain transform is an FFT.

15. A method of radar automatic target recognition comprising the steps of:

sending a radar signal;

receiving a return radar signal;

defining a pattern space based on said return radar signal;

performing a wavelet transform on the entire pattern space;

selecting a reduced feature space from the wavelet transformed pattern space; and classifying a target on the basis of said selected reduced feature space.

16. An apparatus for classifying a pattern, said apparatus comprising;

means for acquiring a signal, said signal including an input pattern to be classified;

means for sampling the acquired signal to produce an intermediate pattern based on said signal;

means for performing a transform on at least a portion of said intermediate pattern, said transform being from the group consisting of wavelet transforms and wavelet packet transforms to produce a wavelet transformed pattern;

means for selecting a reduced feature space from the wavelet transformed pattern; and means for classifying said input pattern on the basis of said reduced feature space.

17. An apparatus as claimed in claim 16, wherein said means for acquiring a signal comprises a single polarized transmitter and a single polarized receiver.

18. An apparatus as claimed in claim 16, wherein said means for acquiring a signal comprises a dual polarized transmitter and a single polarized receiver.

19. An apparatus as claimed in claim 16, wherein said means for acquiring a signal comprises a single polarized transmitter and a dual polarized receiver.

20. An apparatus as claimed in claim 16, wherein said means for acquiring a signal comprises a dual polarized transmitter and a dual polarized receiver.

21. An apparatus as claimed in claim 16, wherein said means for performing a wavelet transform on at least a portion of said intermediate pattern comprises means for performing a transform on the entire immediate pattern.

22. An apparatus as claimed in claim 16, wherein said means for performing a transform on at least a portion of the intermediate pattern comprises means for performing a wavelet transform on a selected subset of the intermediate pattern.

23. An apparatus as claimed in claim 16, wherein said means for selecting a reduced feature space from the wavelet transformed pattern comprises means for selecting the reduced feature space using mathematical methods based on statistics of the wavelet features.

24. An apparatus as claimed in claim 16, wherein said means for selecting a reduced feature space from the wavelet transformed pattern comprises means for selecting the reduced feature space using heuristic methods based on the statistics of the wavelet features.

25. An apparatus as claimed in claim 16, wherein said means for classifying said pattern on the basis of said reduced feature space comprises means for classifying a target on the basis of said selected reduced feature space.

26. An apparatus as claimed in claim 16, wherein said means for classifying said pattern on the basis of said reduced feature space comprises means for discriminating between targets and man-made nontargets on the basis of said selected reduced feature space.

27. An apparatus as claimed in claim 16, wherein said means for classifying said pattern on the basis of said reduced feature space comprises means for discriminating between targets and natural clutter on the basis of said selected reduced feature space.

28. An apparatus as claimed in claim 16, wherein said means for sampling the acquired signal comprises means for performing a domain transform on said acquired signal.

29. An apparatus as claimed in claim 28, wherein said means for performing a domain transform comprises means for performing an FFT.

30. An apparatus for radar automatic target recognition comprising:

a transmitter for transmitting radar signals;

a receiver for receiving return radar signals;

means responsive to said receiver for defining a pattern space based on said return radar signals;

means, responsive to said defining means, for performing a wavelet transform on the entire pattern space to generate a wavelet transformed pattern space;

means, responsive to said wavelet transform means, for selecting a reduced feature space from the wavelet transformed pattern space; and means, responsive to said selecting means, for classifying a target on the basis of said selected reduced feature space.

31. An apparatus as claimed in claim 30, wherein said classifying means comprises a quadratic classifier.

32. An apparatus as claimed in claim 30, wherein said pattern space defining means comprises:

FFT means for performing an FFT on said return radar signals to produce Fourier transformed radar signals; and means, responsive to said FFT means, for detecting the magnitude of said Fourier transformed radar signals.

* * * * *